United States Patent
Rahn

(10) Patent No.: US 6,419,434 B1
(45) Date of Patent: Jul. 16, 2002

(54) ADJUSTABLE LENGTH CARGO BRACE

(75) Inventor: Robert D. Rahn, Hillsboro, KS (US)

(73) Assignee: Harper Trucks, Inc., Wichita, KS (US)

( * ) Notice: Subject to any disclaimer, the term of this patent is extended or adjusted under 35 U.S.C. 154(b) by 0 days.

(21) Appl. No.: 09/561,790

(22) Filed: May 1, 2000

(51) Int. Cl.$^7$ .................................................. B60P 7/15
(52) U.S. Cl. ..................................... 410/151; 410/143
(58) Field of Search ................................ 410/143, 145, 410/151, 122, 124; 211/105.3; 248/354.6, 354.5

(56) References Cited

U.S. PATENT DOCUMENTS

| | | | |
|---|---|---|---|
| 1,793,035 A | | 2/1931 | Whitney |
| 2,350,113 A | | 5/1944 | Hurley |
| 2,411,768 A | | 1/1946 | Welch |
| 3,090,600 A | * | 5/1963 | Smith ......................... 410/151 |
| 3,612,463 A | | 10/1971 | Grant |
| 4,720,222 A | * | 1/1988 | Nagy et al. .................. 410/151 |
| 5,018,918 A | * | 5/1991 | Jacobs et al. ................ 410/145 |
| 5,104,269 A | * | 4/1992 | Hardison ................. 410/145 X |
| 5,769,580 A | * | 6/1998 | Purvis ......................... 410/151 |
| 5,947,666 A | * | 9/1999 | Huang ......................... 410/151 |

* cited by examiner

Primary Examiner—Stephen T. Gordon
(74) Attorney, Agent, or Firm—Edward L. Brown, Jr.

(57) ABSTRACT

An adjustable length cargo brace for restraining loads in semi-trailers comprising two legs, one connected to the other for through an offset collar permitting a limited pivotal and sliding movement between the two legs, a pin member on one of the legs approximate the offset collar which releaseably engages one of a series of openings positioned longitudinally along the opposite leg to engage the two legs together in a pivotally toggled action as they move into parallel contacting relation and a releaseable hook member mounted on one of the legs for engaging and retaining the other leg in parallel contacting relation.

9 Claims, 1 Drawing Sheet

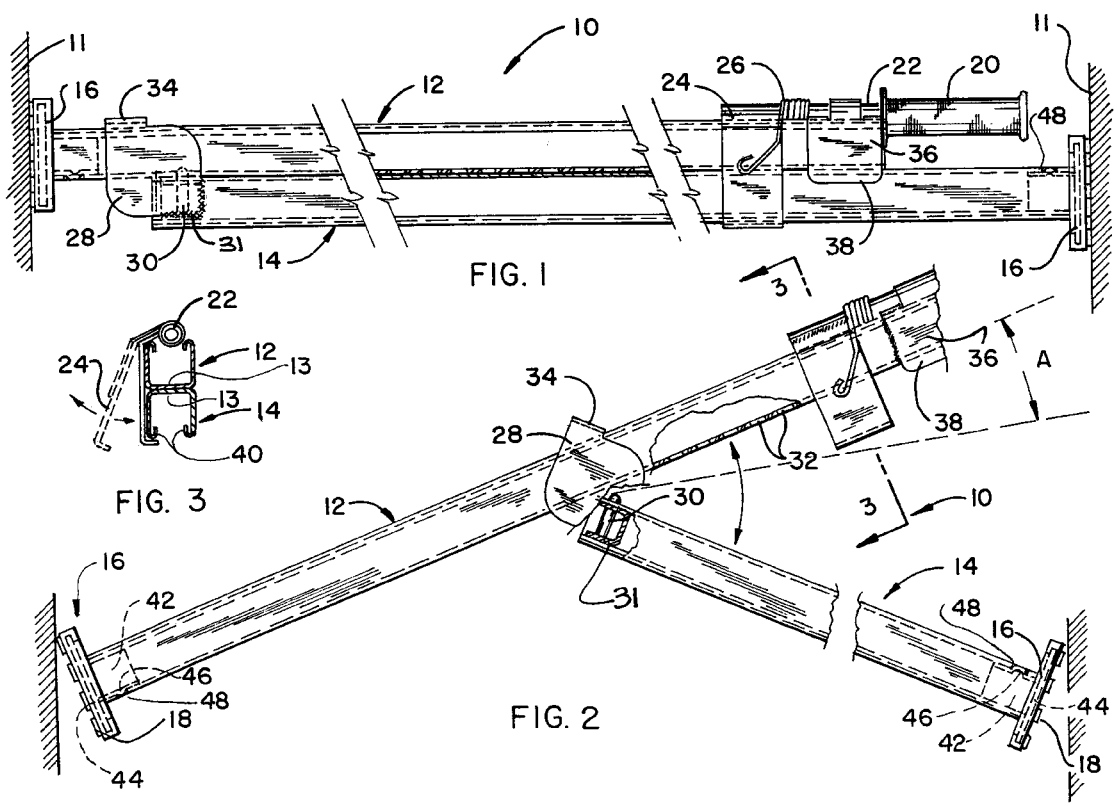

ADJUSTABLE LENGTH CARGO BRACE

FIELD OF INVENTION

This invention relates to cargo braces in semitrailers and shipping containers and is particularly concerned with an adjustable length, two-legged brace for wedging engagement against the walls of the semitrailer to prevent them from shifting during transport.

In the mass shipment of cargo goods either by truck or rail, the packaged goods must be stabilized against movement within the trailer or container so as to prevent the packaged goods from shifting during transit which can be damaging to the goods and a dangerous condition. One traditional form has been to surround the goods with dunnage which could be of various loose material to support and protect the goods from shifting and vibration during transit. Another method was wood bracing, custom fitted and nailed in place which is likewise too time consuming to be commercially feasible.

Today this is typically done in semi-trailers with adjustable length braces which are wedged against the vertical walls of a semi-trailer. They are adjustable in length through the use of racheting devices on one end of the brace which are quite similar to automobile jacks which provide a small degree of adjustment in the range of 15 inches. They include rubber foot pads on the ends of the braces which when the brace is jacked outward against the walls of the container, it provides sufficient friction to retain the freight in position during transit. These cargo braces need to be readily set in place and quickly removable so as to minimize the time for loading and unloading.

The general concept of a toggle-type cargo brace is generally taught in a variety of patents for a variety of uses. The patent to Grant, U.S. Pat. No. 3,612,463 illustrates a pallet wedging brace with a substantially different cross section and connecting structure than the present invention. The patent to Whitney, U.S. Pat. No. 1,793,035, teaches a toggle arrangement utilized as a closet hanging bar. The patent to Hurley, U.S. Pat. No. 2,350,113, illustrates a light fixture support in a toggle arrangement. The patent to Welch, U.S. Pat. No. 2,411,768 illustrates a box car brace which extends its legs outward for engagement with the walls of the container.

SUMMARY OF THE PRESENT INVENTION

The commercial market today requires a cargo brace which is adjustable in length and can be wedged outwardly against the walls of the semi-trailer to provide sufficient restraining and holding power and yet be quickly removable.

The cargo brace of the present invention is an optimum design achieving these results with a very simplified mechanical structure which utilizes the principle of a toggle to wedge the brace into sufficient holding power against the walls of the trailer. The broad concept of a toggle acting cargo brace is taught in the patents mentioned above; however, the design of the present invention teaches an optimum design which readily collapses to substantially half of its extended length with its two legs held together in a locked relation until its ready for its next use. The current jack-type cargo braces on the market today, as discussed above, are essentially two feet greater in length in their collapsed condition and the jacking device frequently malfunctions upon attempted removal.

The overlapping legs and their box cross section of the present invention provide a substantially stronger brace as to bending loads than the telescoping tubular jack-type braces previously discussed. The present invention provides an adjustable length cargo brace with a very simple mechanical design having maximum strength which collapses to a minimum size brace in its collapsed condition.

The object of the present invention is to provide an adjustable length cargo brace which can be made at reduced cost, is easy to use and is substantially maintenance free.

Further objects and advantages of this invention will be apparent from the following detailed description of the preferred embodiment shown in the accompanying drawings.

BRIEF DESCRIPTION OF THE DRAWINGS

FIG. 1 is a side elevational view of the cargo brace positioned between the walls of a semi-trailer;

FIG. 2 is a side elevational view with the two legs angularly positioned for adjustable length prior to engagement.

FIG. 3 is a sectional view of the cargo brace taken along lines 3—3 of FIG. 2 illustrating the engaging hook in its various positions.

DETAILED DESCRIPTION OF THE PREFERRED EMBODIMENT

The cargo brace of the present invention is generally identified by reference numeral 10 as shown in the drawings which include two leg members 12 and 14 as best seen in FIG. 2. Leg 14 is attached to leg 12 through an offset collar 28 which is basically U-shaped when viewed longitudinally. When the angle between legs 12 and 14 is greater than angle A shown in FIG. 2, leg 14 is free to slide longitudinally along leg 12 to its almost fully collapsed position as illustrated in FIG. 1. Legs 12 and 14 are channel-shaped in cross section with rolled back edges 40 as seen in FIG. 3. The web 13 of each channel lies in contacting relation with the other when brace 10 is in its operative position.

Leg 12 includes a series of openings 32 in the web portion 13 of the leg positioned along its length at one inch spacings to provide an adjustable length brace. Located at the left end of the leg 14, partially surrounded by collar 28, is locking pin 30 which extends through the web of leg 14 and selectively engages various openings 32 to provide an adjustable length brace. Surrounding pin 30 is a short piece of channel 31 which is welded to pin 30 and leg 14 to strengthen the engagement point between the two legs 12 and 14. Each leg 12 and 14 on its outer end includes a foot pad 16 which is covered by a rubber pad having suction cups 18 thereon for gripping action with the wall when the brace is set in place. The foot pads 16 are removable from the legs and include a short channel section 42 which telescopes into the end of each leg. Channel section 42 is in turn welded to a flat plate 44 and includes a dimple 46 which engages a hole 48 in legs 14 and 12 to provide a releaseable connection.

Once leg 14 is rotated from its FIG. 2 position to an angle less than 15 degrees, pin 30 will engage an opening 32 in leg 12 and thereby prevent any further sliding movement between legs 12 and 14. At this point the two legs, 12 and 14, are now pivotally connected together and as they are forced in a toggle action into a parallel relation with each other, as seen in FIG. 1, their foot pads are forced slightly outward thereby extending the overall length of the brace and gripping into contact with the side walls 11. Attached to the right end of leg 12 is a locking hook 24, as best seen in FIGS. 2 and 3 which engages and holds legs 12 and 14 together in juxtaposed contacting relation. Hook 24 is mounted on shaft 22 which in turn is journaled to bracket 36. Hook 24 is spring biased by spring 26 into its engaging position locking legs 12 and 14 together. Hook 24 can be released by rotating handle 20 in a clockwise direction as seen in FIG. 3. Bracket 36 includes a pair of ears 38 which extend downwardly from leg 12 to surround leg 14 and maintain its lateral alignment with leg 12. Once hook 24 has engaged leg 14 it is also held against any lateral movement between the legs by ears 38. In this locked position, as illustrated in FIG. 1, both ends of each leg 12 and 14 is restrained and held against its adjacent leg. As seen in FIG. 1, cross over portion 34 of collar 28 retains the legs together while at the right end hook 24 and ears 38 lock the two legs together.

Operation

The adjustable cargo brace 10 of the present invention collapses basically to half its extended length which is shown in FIG. 1. In its operative position which is not shown, the legs 12 and 14 are extended so that collar 28 and hook 24 are relatively close together with an overall length close to ten feet. In the collapsed condition, spring 26 retains the right ends of the two legs together along with the assistance of ears 38 until the brace is ready for use. Once the brace is in place, ready for extension against its supporting walls, handle 20 manually rotates hook 24 out of engagement with the leg 14 which thereby allows leg 14 to pivot away from leg 12 as seen in FIG. 2, once the angle between the legs exceeds approximately 15 degrees as indicated by angle A, leg 14 is now free to slide along leg 12 with the restraints of collar 28 and cross over portion 34. Once the approximate length has been reached with the pads 18 contacting the walls 11, the legs are brought together with pin 30 engaging an opening 32. As pin 30 engages opening 32 leg 14 will no longer slide on leg 12 and the pin 30 and opening 32 become a pivot point and as the two legs are brought into parallel relation with each other in a toggle action. The ends of the brace during the movement are extended outwards a slight distance causing foot pad 16 with their rubber section cups 18 to grip and hold against the wall 11. As the legs 12 and 14 approach their parallel contacting position, hook 24 must be manually pulled to the side allowing the legs to come together to their FIG. 1 position. The spring-biased hook 24 and ears 38 retain the legs 12 and 14 in a locked relationship.

The removal of the brace 10 simply entails rotation of the hook 24 out of engagement with leg 14 and lifting handle 20 which causes the two legs to pivot relative to each other and release the brace 10 from the wall. The brace can then be fully collapsed by sliding offset collar 34 all the way to the left end of leg 12 as seen in FIG. 2 whereupon the two legs are brought together and locked against rotation through the action of hook 24.

From the foregoing description and the accompanying drawings, it will be apparent that the disclosed embodiment of the present invention can be readily used in all types of shipping containers. While only a single embodiment of the invention has been illustrated and described, it is not intended to be limited thereby but only by the scope of the appended claims.

What is claimed is:

1. An adjustable length cargo brace for restraining loads in semi-trailers comprising:

a first leg having a foot pad on one end thereof and a series of openings spaced longitudinally therealong;

a second leg having a foot pad on one end and an offset collar at the other end, the collar surrounding the first leg and permitting pivotal and sliding movement between the first and second legs;

a pin member on the second leg proximate the offset collar releasably engageable with one of said openings on the first leg to lock the two legs against sliding movement relative to each other; and a releasable engaging member mounted on one of said legs for engaging the other leg in juxtaposed contacting relation.

2. An adjustable length cargo brace, as set forth in claim 1, wherein the engaging member is a pivotally mounted hook.

3. An adjustable length cargo brace, as set forth in claim 1, wherein the engaging member is a pivotally mounted hook on the first leg at the first leg end opposite the foot pad.

4. An adjustable length cargo brace, as set forth in claim 1, wherein the pin member is positioned partially surrounded by the offset collar and the leg members are channel-shaped in cross-section with the web of each channel cross-section in juxtaposed contacting relation.

5. An adjustable length cargo brace, as set forth in claim 1, including a pair of alignment ears on said first leg which engage the second leg for alignment when the legs are in juxtaposed contacting relation.

6. An adjustable length cargo brace, as set forth in claim 1, including a pair of alignment ears on said first leg adjacent said engaging member which ears engage the second leg for alignment when the legs are in juxtaposed contacting relation.

7. An adjustable length cargo brace, as set forth in claim 1, wherein the pin member on the second leg has a sufficiently short length that the pin member disengages the openings on the first leg at any relative angle between the two legs greater than 15 degrees.

8. An adjustable length cargo brace, as set forth in claim 1, wherein the engaging member is a pivotally mounted hook on the first leg which rotates upon an axis parallel to the longitudinal axis of the first leg, the hook including biasing means urging it into engagement with the second leg.

9. An adjustable length cargo brace for restraining loads in semi-trailers comprising:

a first leg having a foot pad on one end thereof;

a second leg having a foot pad on one end an offset collar at the other end, the collar surrounding the first leg and permitting limited pivotal and sliding movement between the first and second legs;

a pin member on one of the legs;

a series of openings spaced longitudinally along the other of said legs which are releasably engageable by said pin member to lock the two legs against sliding movement relative to each other; and a releasable engaging member mounted on one of said legs for engaging the other leg in juxtaposed contacting relation.

* * * * *